United States Patent
Niigata

(10) Patent No.: US 11,892,660 B2
(45) Date of Patent: Feb. 6, 2024

(54) REFLECTING ELEMENT, LIGHT DEFLECTING DEVICE, IMAGE PROJECTION DEVICE, OPTICAL WRITING DEVICE, OBJECT RECOGNITION DEVICE, MOBILE OBJECT, AND HEAD-MOUNTED DISPLAY

(71) Applicant: Ricoh Company, Ltd., Tokyo (JP)

(72) Inventor: Kazutaka Niigata, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/188,927

(22) Filed: Mar. 1, 2021

(65) Prior Publication Data
US 2021/0294004 A1  Sep. 23, 2021

(30) Foreign Application Priority Data
Mar. 19, 2020  (JP) ................. 2020-050319

(51) Int. Cl.
*G02B 5/08* (2006.01)
*G02B 26/08* (2006.01)
*G02B 26/10* (2006.01)

(52) U.S. Cl.
CPC ......... *G02B 5/0825* (2013.01); *G02B 5/0858* (2013.01); *G02B 26/0858* (2013.01); *G02B 26/10* (2013.01); *G02B 26/105* (2013.01)

(58) Field of Classification Search
CPC .............. G02B 5/0858; G02B 26/08; G02B 26/0833–0866; G02B 26/105
See application file for complete search history.

(56) References Cited

U.S. PATENT DOCUMENTS

| 4,322,130 | A  | * | 3/1982 | Ito    | G02B 27/288 |
|           |    |   |        |        | 359/585 |
| 2006/0187551 | A1 | * | 8/2006 | Huang  | G02B 5/0858 |
|           |    |   |        |        | 359/582 |
| 2016/0077346 | A1 | * | 3/2016 | Wang   | C23C 14/083 |
|           |    |   |        |        | 29/458 |

(Continued)

FOREIGN PATENT DOCUMENTS

| JP | H02-287301 A | 11/1990 |
| JP | H09-274076 A | 10/1997 |

(Continued)

OTHER PUBLICATIONS

RefractiveIndex.INFO ("Refractive Index of Al2O3" and "Refractive Index of ZrO2," available at: https://refractiveindex.info/, accessed Nov. 2, 2022 (Year: 1982).*

(Continued)

*Primary Examiner* — Kimberly N. Kakalec
(74) *Attorney, Agent, or Firm* — XSENSUS LLP

(57) ABSTRACT

A reflecting element includes a first reflecting film to reflect light and a second reflecting film configured to increase a reflectivity of the first reflecting film. The second reflecting film includes a layer of high-refractive-index material and a layer of low-refractive-index material with a refractive index lower than the layer of high-refractive-index material. The layer of low-refractive-index material is a top layer of the second reflecting film.

16 Claims, 16 Drawing Sheets

(56) References Cited

U.S. PATENT DOCUMENTS

2018/0314056 A1* 11/2018 Schatz ............... G02B 26/0841
2020/0301049 A1 9/2020 Niigata

FOREIGN PATENT DOCUMENTS

JP 2011-242522 12/2011
JP 2016-148788 8/2016

OTHER PUBLICATIONS

Pedrotti et al., Introduction to Optics, Second Edition, pp. 402-404, 1993 (Year: 1993).*
Office Action dated Oct. 17, 2023 in Japanese Patent Application No. 2020-050319, 6 pages.

* cited by examiner

REFLECTING ELEMENT, LIGHT DEFLECTING DEVICE, IMAGE PROJECTION DEVICE, OPTICAL WRITING DEVICE, OBJECT RECOGNITION DEVICE, MOBILE OBJECT, AND HEAD-MOUNTED DISPLAY

CROSS-REFERENCE TO RELATED APPLICATIONS

This patent application is based on and claims priority pursuant to 35 U.S.C. § 119(a) to Japanese Patent Application No. 2020-050319, filed on Mar. 19, 2020, in the Japan Patent Office, the entire disclosure of which is hereby incorporated by reference herein.

BACKGROUND

Technical Field

Embodiments of the present disclosure relate to a reflector, a light deflecting device incorporating the reflector, an image projection device incorporating the light deflecting device, an optical writing device incorporating the light deflecting device, an object recognition device incorporating the light deflecting device, a mobile object incorporating the light deflecting device, and a head-mounted display incorporating the light deflecting device.

Related Art

In recent years, micro-electromechanical systems (MEMS) using a piezoelectric membrane as an actuator are known. In particular, light deflectors with reflecting surfaces for optical scanning have been actively developed.

SUMMARY

In one aspect of this disclosure, there is described a reflecting element including: a first reflecting film to reflect light; and a second reflecting film configured to increase a reflectivity of the first reflecting film. The second reflecting film includes a layer of high-refractive-index material and a layer of low-refractive-index material with a refractive index lower than the layer of high-refractive-index material. The layer of low-refractive-index material is a top layer of the second reflecting film.

In another aspect of this disclosure, there is disclosed a light deflector including the reflecting element and a movable device configured to move the reflecting element to scan with the light reflected by the reflecting element.

In even another aspect of this disclosure, there is disclosed an image projection device including the light defecting device.

In still another aspect of this disclosure, an optical writing device includes the light deflecting device.

In yet another aspect of this disclosure, an object recognition device includes the light deflecting device.

Further described is a mobile object including the light deflecting device.

Still further described is a head-mounted display including the light deflecting device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
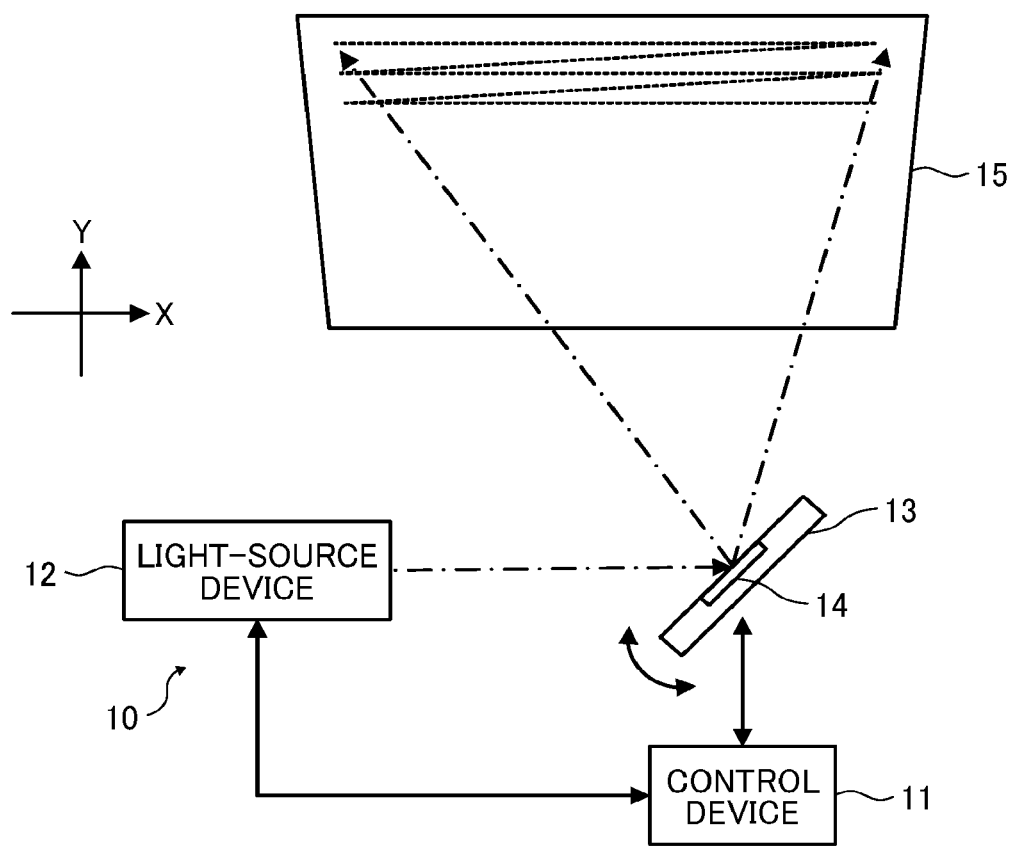
FIG. 1 is an illustration of a configuration of an optical scanning system incorporating a light deflector according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The embodiments of the present disclosure achieve both a higher reflectivity of the reflecting surface and its higher durability against laser radiation.

Embodiments of an optical scanning system are described with reference to the drawings.

FIG. 1 is an illustration of the configuration of an optical scanning system 10 (a light deflecting device) incorporating a mirror unit 101 (a reflector) according to an embodiment of the present disclosure. The optical scanning system 10 includes a control device 11, a light-source device 12, and a light deflector 13 (a movable device) having a reflecting surface 14. As illustrated in FIG. 1, the optical scanning system 10 deflects light emitted from light-source device 12, using the reflecting surface 14 of the light deflector 13, under the control of the control device 11 so as to optically scan a surface 15 to be scanned.

For example, the control device 11 is an electronic circuit unit provided with a central processing unit (CPU) and a field-programmable gate array (FPGA). For example, the light deflector 13 is a MEMS with, for example, a movable reflecting surface 14. The light-source device 12 is, for example, a laser device that emits a laser beam. The surface to be scanned 15 is, for example, a screen.

The control device 11 generates instructions for controlling the light-source device 12 and the light deflector 13 in accordance with optical scanning information obtained from an external device, and outputs drive signals in accordance with the instructions to the light-source device 12 and the light deflector 13.

The light-source device 12 emits light in accordance with the drive signal received.

In accordance with the drive signal received, the light deflector 13 moves the reflecting surface 14 uniaxially or biaxially, or in two or more directions.

In such an optical scanning system 10, the reflecting surface 14 of the light deflector 13 can biaxially reciprocate to deflect the light that has been emitted from light-source device 12 and incident on the reflecting surface 14, optical scanning to project a desired image onto the surface 15 to be scanned.

Figure 2:
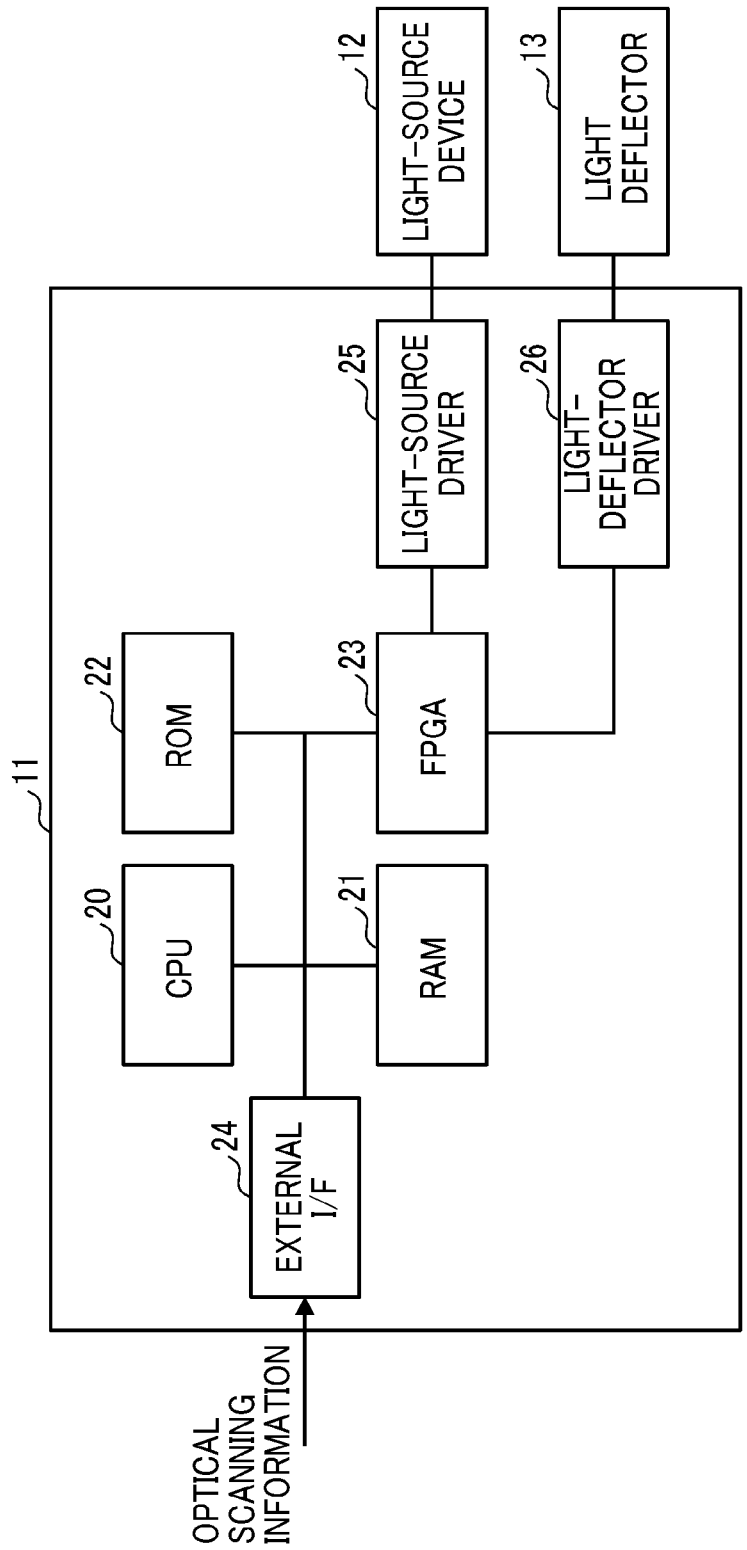
FIG. 2 is a block diagram of a hardware configuration of the optical scanning system in FIG. 1.

FIG. 2 is a block diagram of a hardware configuration of the optical scanning system 10. As illustrated in FIG. 2, the optical scanning system 10 includes the control device 11, the light-source device 12, and the light deflector 13, which are electrically connected to each other.

The control device 11 includes a central processing unit (CPU) 20, a random access memory (RAM) 21, a read only memory (ROM) 22, a field-programmable gate array (FPGA) 23, an external interface (I/F) 24, a light-source driver 25, and a light-deflector driver 26.

The CPU 20 is an arithmetic device that loads into the RAM 21 a program or data from a storage device such as the ROM 22 and executes processing to control the entirety of the control device 11.

The RAM 21 is a volatile storage device that temporarily stores a program and data.

The ROM 22 is a non-volatile storage device that stores a program or data even after the power is turned off, and stores a program or data for processing that is executed by the CPU 20 to control each function of the optical scanning system 10.

The FPGA 23 is a circuit that outputs control signals to the light-source driver 25 and the light-deflector driver 26, respectively, in accordance with the processes of the CPU 20.

For example, the external I/F 24 is an interface with an external device or the network. The external device may be, for example, a host device such as a personal computer (PC); or a storage device, such as a universal serial bus (USB) memory, a secure digital (SD) card, a compact disk (CD), a digital versatile disk (DVD), a hard disk drive (HDD), or a solid state drive (SSD). For example, the network may be a controller area network (CAN) of a vehicle, a local area network (LAN), and the Internet. The external I/F 24 may have any configuration that achieves connection to an external device or communication with an external device. The external I/F 24 may be provided for each external device.

The light-source driver 25 is an electric circuit that outputs a drive signal such as a drive voltage to the light-source device 12 in accordance with the received control signal.

The light-deflector driver 26 is an electric circuit that outputs a driving signal such as a driving voltage to the light deflector 13 in accordance with the control signal input from the FPGA 23.

In the control device 11, the CPU 20 acquires optical-scanning information from an external device or the network through the external I/F 24. The CPU 20 may have any configuration that acquires optical scanning information. In some examples, the optical scanning information may be stored in the ROM 22 or in the FPGA 23 of the control device 11. In some other examples, a storage device such as a solid state disk (SSD) may be additionally provided in the control device 11 and the optical scanning information may be stored in the storage device.

In this case, the optical-scanning information indicates how the surface 15 is to be optically scanned. In another example, the optical-scanning information is image data used for optical scanning to display an image. For still another example, the optical-scanning information is writing data indicating the order and portion of writing, for optical writing by optical scanning. Furthermore, for example, the optical scanning information is irradiation data indicating the timing and range of irradiation of light for object recognition by optical scanning.

Figure 3:
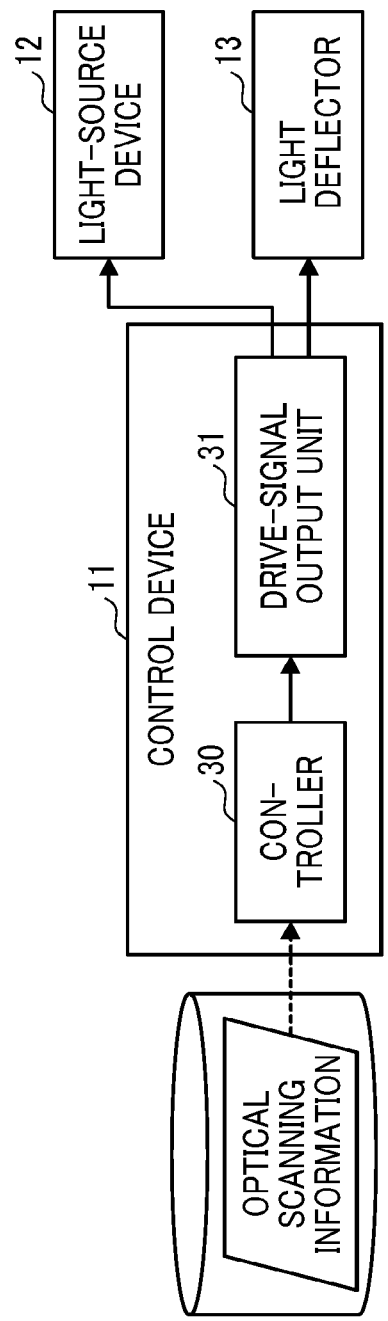
FIG. 3 is a block diagram of a functional configuration of a control device.

FIG. 3 is a block diagram of a functional configuration of the control device 11. The control device 11 has the hardware configuration in FIG. 2, and the capabilities of the controller 30 and the drive-signal output unit 31 are implemented by the hardware configuration in accordance with instructions from the CPU 20.

The controller 30 is implemented by, for example, the CPU 20 and the FPGA 23. The controller 30 acquires optical-scanning information from an external device, converts the optical-scanning information into a control signal, and outputs the control signal to the drive-signal output unit 31. The controller 30 specifically acquires image data as the optical-scanning information from, for example, an external device, generates a control signal from the image data through predetermined processing, and outputs the control signal to the drive-signal output unit 31.

The drive-signal output unit 31 is implemented by, for example, the light-source driver 25 or the light-deflector driver 26. The drive-signal output unit 31 outputs a drive signal to the light-source device 12 or the light deflector 13 in accordance with the received control signal. The drive-signal output unit 31 may be provided for each destination to which a driving signal is output.

The drive signal is a signal used to control operation of the light-source device 12 or the light deflector 13. For example, the drive signal for the light-source device 12 is a drive voltage used to control the timing at which light is emitted from the light source and the irradiation intensity of the light to be emitted from the light source. Further, the drive signal to be output to the light deflector 13 is, for example, a drive voltage used to control the timing and range of motion where the reflecting surface 14 of the light deflector 13 is moved. Alternatively, the control device 11 may obtain, from an external device such as the light-source device 12 or a light receiver, the timing of light emission or timing of light reception of the light emitted from the light source, and may synchronize the obtained timing of light emission or timing of light reception with the operation of the light deflector 13.

Figure 4:
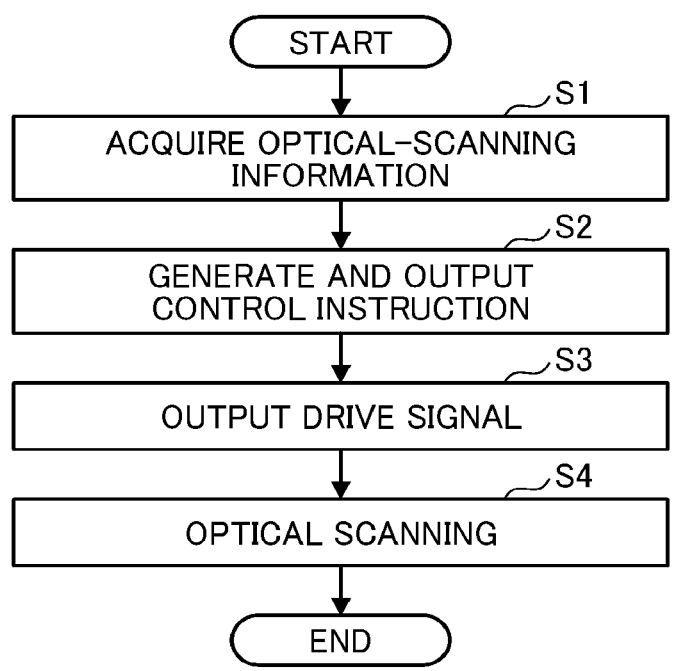
FIG. 4 is a flowchart of a process of optically scanning a surface to be scanned, performed by the optical scanning system in FIG. 1.

FIG. 4 is a flowchart of the process of optically scanning the surface 15 to be scanned, performed by the optical scanning system 10 in FIG. 1. In the flowchart of FIG. 4, the controller 30 acquires optical scanning information from, for example, an external device in step S1.

In step S2, the controller 30 generates a control signal in accordance with the optical scanning information acquired, and outputs the generated control signal to the drive-signal output unit 31.

In step S3, the drive-signal output unit 31 outputs a drive signal in accordance with the received control signal to each of the light-source device 12 and the light deflector 13.

In step S4, the light-source device 12 emits light in accordance with the received drive signal. The light deflector 13 moves the reflecting surface 14 in accordance with the received drive signal. The driving of the light-source device 12 and the light deflector 13 causes light to be deflected in a given direction, optical scanning.

In the optical scanning system 10 described above, a single control device 11 has a device and a function for controlling the light-source device 12 and the light deflector 13. In some examples, a control device for the light-source device 12 and a control device for the light deflector 13 may be separate elements.

In the optical scanning system 10 described above, a single control device 11 has the functions of the controller 30 and the functions of the drive-signal output unit 31 for the light-source device 12 and light deflector 13. These functions may be implemented by separate elements. For example, a drive-signal output device including a drive-signal output unit 31 may be provided in addition to the control device 11 including the controller 30. An optical deflection system that performs optical deflection may be configured by the control device 11 and the light deflector 13 provided with the reflecting surface 14, which are elements of the above optical scanning system 10.

Figure 5:
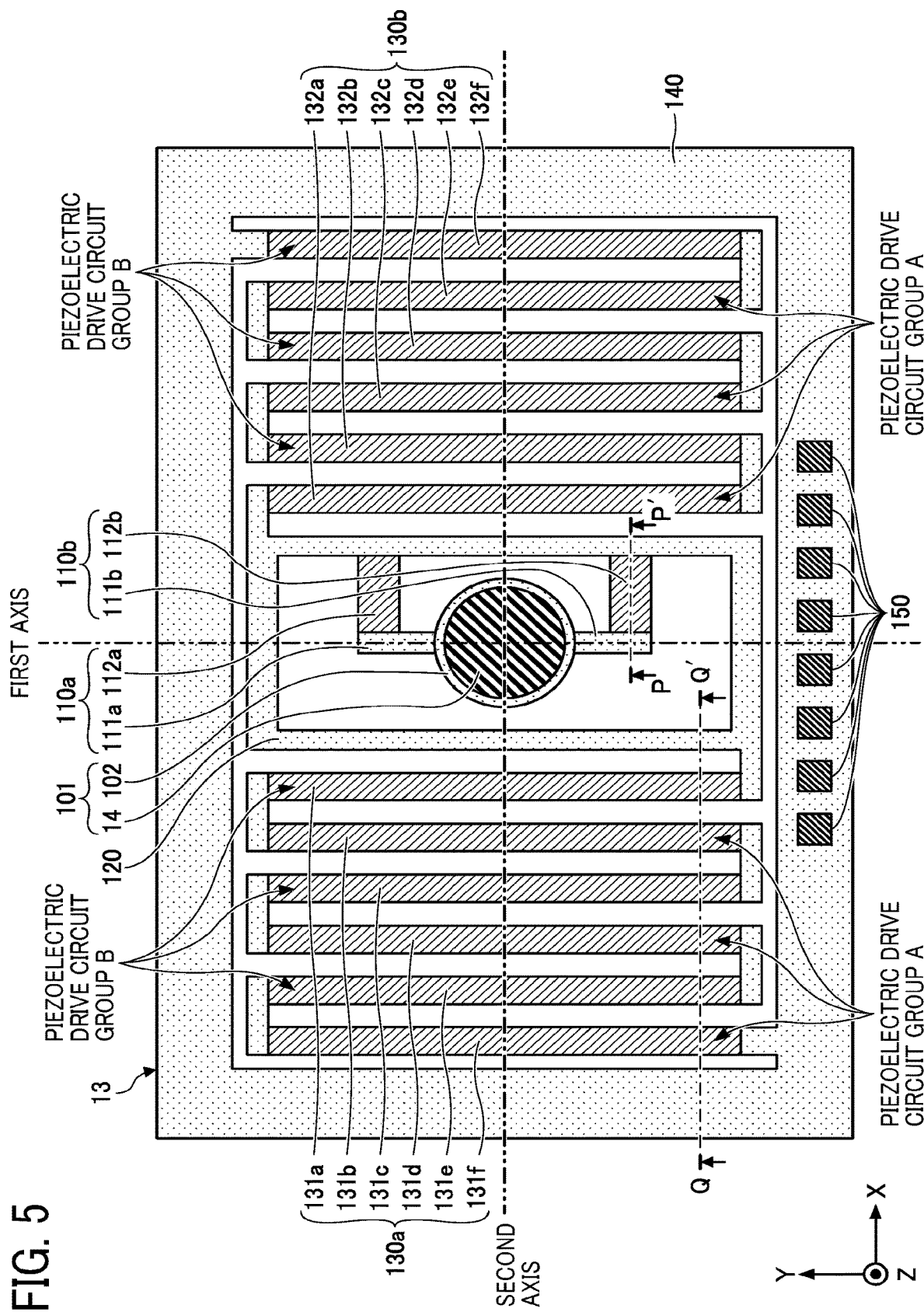
FIG. 5 is a plan view of the light deflector as viewed from a reflecting surface of the light deflector according to an embodiment.
Figure 6:
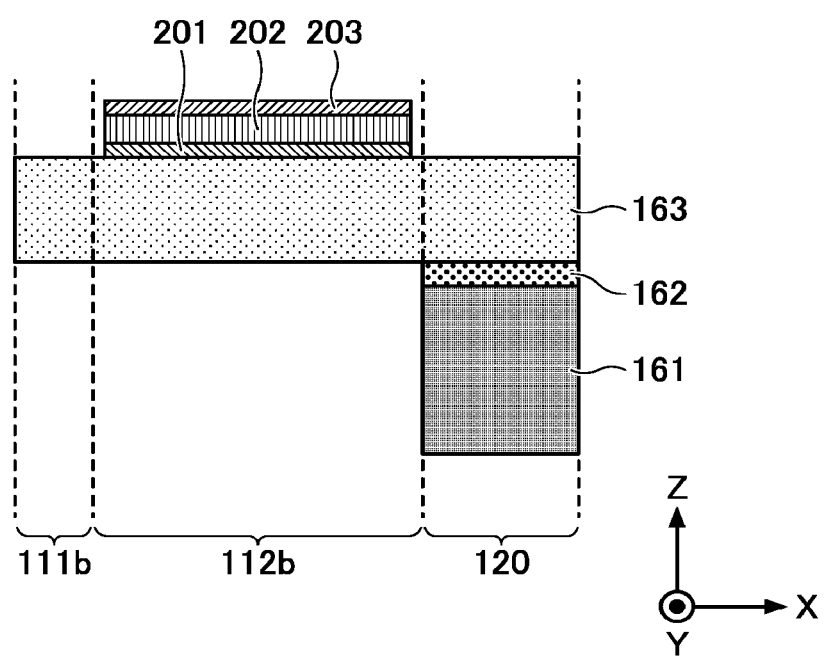
FIG. 6 is a cross-sectional view taken along the line P-P' in FIG. 5.
Figure 7:
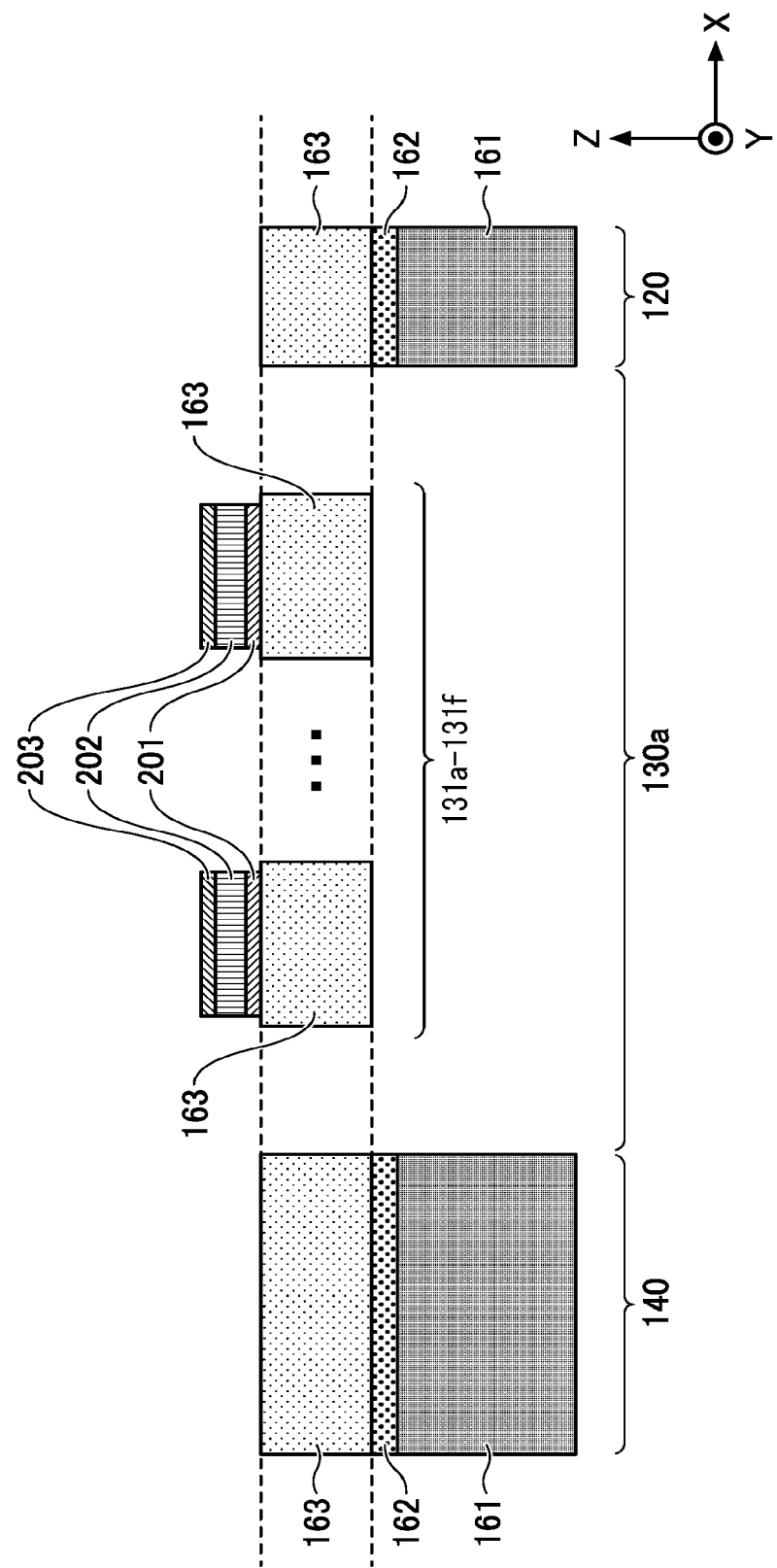
FIG. 7 is a cross-sectional view taken along the line Q-Q' in FIG. 5.

FIG. 5 is a plan view of a light deflector capable of biaxially deflecting light. FIG. 6 is a cross-sectional view taken along the line P-P' in FIG. 5. FIG. 7 is a cross-sectional view taken along the line Q-Q' in FIG. 5.

As illustrated in FIG. 5, the light deflector 13 includes a mirror unit 101 (a reflecting element) that reflects incident light, first drive units 110a and 110b that are coupled to the mirror unit 101 and move the mirror unit 101 about a first axis parallel to the Y-axis, and a first supporting unit 120 that supports the mirror unit 101 and the first drive units 110a and 110b. The light deflector 13 further includes second drive units 130a and 130b that are coupled to the mirror unit 101 and move the mirror unit 101 and the first drive units 110a and 110b bout a second axis parallel to the X-axis, and a second supporting unit 140 that supports the second drive units 130a and 130b. The light deflector 13 further includes electrode connecting parts 150 electrically connected to the first drive units 110a and 110b, the second drive units 130a and 130b, and the control device 11.

The light deflector 13 is molded by etching a sheet of silicon on insulator (SOI) substrate. On the SOI substrate, components such as the reflecting surface 14, first piezoelectric drive circuits 112a and 112b, second piezoelectric drive circuits 131a to 131f and 132a to 132f, and the electrode connecting part 150 first piezoelectric drive circuits 112a and 112b, second piezoelectric drive circuits 131a to 131f and 132a to 132f, and the electrode connecting parts 150 are formed as a single integrated unit. The components may be formed after the SOI substrate is molded, or may be formed during the molding of the SOI substrate.

As illustrated in FIG. 6, the SOI substrate includes a first silicon layer (161) formed of single crystal silicon (Si), a silicon oxide layer 162, and a second silicon layer (163) formed of single crystal silicon, which are sequentially stacked on the SOI substrate. In the following description, the first silicon layer and the second silicon layer may be referred to as a silicon supporting layer 161 and a silicon active layer 163, respectively.

The silicon active layer has a smaller thickness in the Z-axis direction than the thickness in the X-axis direction or the Y-axis direction. With such a configuration, any member made of the silicon active layer serves as an elastic member having elasticity.

The SOI substrate does not have to be planar, and may have, for example, a curvature. As long as the substrate can be integrally processed by etching or the like and can be partly elastic, the member used for forming the light deflector 13 is not limited to the SOI substrate.

The mirror unit 101 includes, for example, a circular mirror-unit base 102 and the reflecting surface 14 that is formed on the +Z surface of the mirror-unit base 102. The mirror-unit base 102 includes, for example, a silicon active layer 163. The reflecting surface 14 includes a thin metal film containing aluminum (Al), gold (Au), and silver (Ag). The mirror unit 101 may include a rib for strengthening the mirror unit on the −Z surface of the mirror-unit base 102. Such a rib includes, for example, the silicon supporting layer 161 and the silicon oxide layer 162, serving to prevent the distortion of the reflecting surface 14 due to the motion. The shape of the mirror-unit base 102 and the reflecting surface 14 is not limited to any particular shape. The mirror-unit base 102 and the reflecting surface 14 may be circular, elliptical, and polygonal.

As illustrated in FIG. 5, the first driving circuits 110a and 110b include two torsion bars 111a and 111b and first piezoelectric drive circuits 112a and 112b. Each of the torsion bars 111a and 111b has one end coupled to the mirror-unit base 102, and the torsion bars 111a and 111b extend in a first axis direction to support the mirror unit 101 to be movable. Each of the first piezoelectric drive circuits 112a and 112b has one end coupled to a corresponding one of the torsion bars 111a and 111b and the other end couple to an internal circumference of the first supporting unit 120.

As illustrated in FIG. 6, the torsion bars 111a and 111b include the silicon active layer 163. Moreover, the first piezoelectric drive circuits 112a and 112b include the silicon active layer 163, the lower electrode 201, a piezoelectric circuit 202, and an upper electrode 203. The lower electrode 201, the piezoelectric circuit 202, and the upper electrode 203 are formed in this order on the +Z surface of the silicon active layer 163 serving as an elastic member. For example, each of the upper electrode 203 and the lower electrode 201 contains gold (Au) or platinum (Pt). For example, the piezoelectric circuit 202 contains lead zirconate titanate (PZT) as a piezoelectric material.

Referring back to FIG. 5, the first supporting unit 120 is, for example, a rectangular support body including the silicon supporting layer 161, the silicon oxide layer 162, and the silicon active layer 163, surrounding the mirror unit 101.

The second drive units 130a and 130b include, for example, the plurality of second piezoelectric drive circuits 131a to 131f and 132a to 132f that are joined so as to turn. The second drive units 130a and 130b each have one end coupled to the outer edge of the first supporting unit 120 and the other end coupled to the inner edge of the second supporting unit 140. In the present embodiment, a coupling portion of the second drive unit 130a and the first supporting unit 120 and a coupling portion of the second drive unit 130b and the first supporting unit 120 are in substantially point symmetry with respect to the center of the reflecting surface 14. Furthermore, a coupling portion of the second drive unit 130a and the second supporting unit 140 and a coupling portion of the second drive unit 130b and the second supporting unit 140 are in substantially point symmetry with respect to the center of the reflecting surface 14.

As illustrated in FIG. 7, the second driving units 130a and 130b include the silicon active layer 163, the lower electrode 201, the piezoelectric circuit 202, and the upper electrode 203. The lower electrode 201, the piezoelectric circuit 202, and the upper electrode 203 are formed in this order on the +Z surface of the silicon active layer 163 serving as the elastic member. For example, each of the upper electrode 203 and the lower electrode 201 contains gold (Au) or platinum (Pt). For example, the piezoelectric circuit 202 contains lead zirconate titanate (PZT) as a piezoelectric material.

Referring back to FIG. 5, the second supporting unit 140 is, for example, a rectangular support body including the silicon supporting layer 161, the silicon oxide layer 162, the silicon active layer 163, and the silicon oxide layer 164, surrounding the mirror unit 101, the first drive units 110a and 110b, the first supporting unit 120, and the second drive units 130a and 130b.

The electrode connecting part 150 is, for example, formed on the +Z surface of the second supporting unit 140 and are electrically connected to the upper electrode 203 and the lower electrode 201 of each of the first piezoelectric drive circuits 112a and 112b and the second piezoelectric drive circuits 131a to 131f, and the control device 11 via electrode wiring of aluminum (Al). Each of the upper electrodes 203 and the lower electrodes 201 may be directly connected to the electrode connecting parts 150. Alternatively, in some embodiments, the upper electrodes 203 and the lower electrodes 201 may be indirectly connected to the electrode connecting parts 150 through a wire that connects a pair of electrodes.

Although this embodiment has illustrated an example in which the piezoelectric circuit 202 is formed on a surface (+Z surface) of the silicon active layer 163 serving as the elastic member, the piezoelectric circuit 202 may be formed on another surface (e.g., −Z surface) of the elastic member, or on both the surface and the other surface of the elastic member.

The shapes of the components are not limited to the shapes in the present embodiment as long as the mirror unit is rotatable about the first axis or the second axis. For example, the torsion bars 111a and 111b and the first piezoelectric drive circuits 112a and 112b may have a shape with curvature.

Further, an insulating layer including the silicon oxide layer may be disposed on at least any one of the +Z-side surfaces of the upper electrodes 203 of the first drive circuits 110a and 110b, the first supporting unit 120, the upper electrodes 203 of the second drive units 130a and 130b, and the second supporting unit 140. In this case, electrode wiring is provided on the insulating layer, and the insulating layer is partially removed as an opening or is not formed at a connection spot where the upper electrode 203 or the lower electrode 201 and the electrode wiring are connected, so that the first drive units 110a and 110b, the second drive units 130a and 130b, and the electrode wiring can be designed with a higher degree of freedom, and furthermore, a short circuit as a result of contact between electrodes can be substantially prevented. The silicon oxide film also serves as an anti-reflection member.

Next, the control by the control device 11 that drives the first drive units 110a and 110b and the second drive units 130a and 130b of the light deflector 13 is described in detail.

Each of the first drive units 110a and 110b and the second drive units 130a and 130b includes the piezoelectric circuit 202. When voltage that is positive or negative in the direction of polarization is applied to the piezoelectric circuit 202, the piezoelectric circuit 202 deforms (for example, expands and contracts) according to the electrical potential of the applied voltage—inverse piezoelectric effects occur. The first drive units 110a and 110b and the second drive units 130a and 130b move the mirror unit 101 using the above-described piezoelectric effects.

In this case, the angle defined by the reflecting surface 14 of the mirror unit 101 with respect to the XY plane when the reflecting surface 14 is inclined to the +Z direction or −Z direction with respect to the XY plane is referred to as deflection angle. Note also that the +Z-direction is referred to as a positive deflection angle and the −Z-direction is referred to as a negative deflection angle.

First, the control that is performed by the control device 11 to actuate the first drive units 110a and 110b is described. In the first drive units 110a and 110b, when a driving voltage is applied in parallel with the piezoelectric circuit 202 of the first piezoelectric drive circuits 112a and 112b through the upper electrode 203 and the lower electrode 201, the piezoelectric circuit 202 is deformed. With such deformation of the piezoelectric circuit 202, the first piezoelectric drive circuits 112a and 112b bend and deform, which causes the torsion bars 111a and 111b to be twisted. As a result, through the torsion of the two torsion bars 111a and 111b, a driving force acts on the mirror unit 101 around the first axis, and the mirror unit 101 is moved around the first axis. The control device 11 controls the drive voltage applied to the first drive units 110a and 110b.

Accordingly, the control device 11 applies a driving voltage with a predetermined sine waveform to the first piezoelectric drive circuits 112a and 112b of the first drive units 110a and 110b, and thereby, the mirror unit 101 can be moved around the first axis in the period of the drive voltage with a predetermined sine waveform.

For example, if the frequency of the sine-waveform voltage is set to about 20 kilohertz (kHz), which is substantially equal to a resonant frequency of the torsion bars 111a and 111b, by using mechanical resonance as a result of the torsion of the torsion bars 111a and 111b, the mirror unit 101 can be resonated at about 20 kHz.

Figure 8:
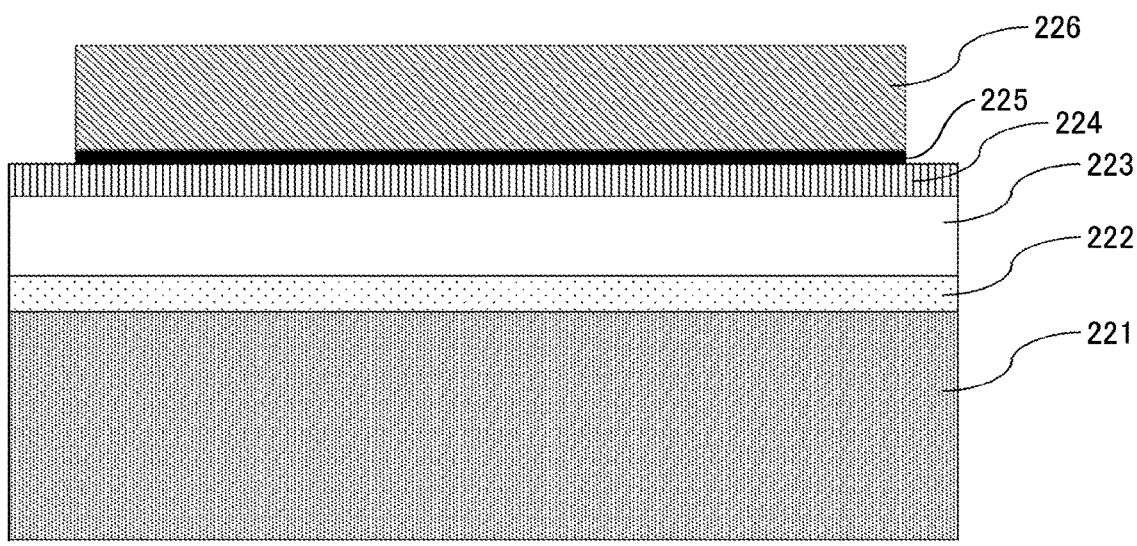
FIG. 8 is a cross-sectional view of a typical general mirror unit.

FIG. 8 is a cross-sectional view of a typical general mirror unit. As illustrated in FIG. 8, the mirror unit includes a silicon supporting layer 221, a silicon oxide film layer 222, a silicon active layer 223, an interlayer film 224, a metal film 225, and a dielectric multilayered film 226 (i.e., a high reflection coating film), which are sequentially stacked on top of each other.

The interlayer film 224 contains, for example, silicon oxide ($SiO_2$), silicon nitride (SiNx), and alumina ($Al_2O_3$). The metal film 225 contains, for example, aluminum (Al), an aluminum alloy (AlCu or AlSiCu), or silver (Ag).

The dielectric multilayered film 226 (i.e., a high reflection coating film) is provided on the metal film 225 to increase the reflectivity. The dielectric multilayered film 226 (i.e., a high reflection coating film) might be damaged depending on the intensity of a laser beam emitted from the light-source device 12.

Figure 9:
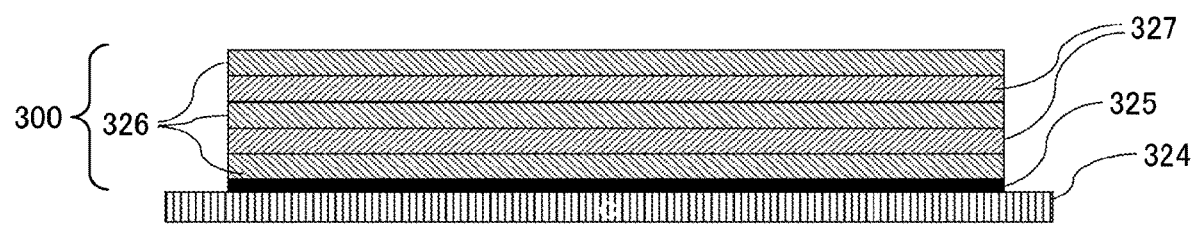
FIG. 9 is a cross-sectional view of a main part of a mirror unit of the light deflector, according to an embodiment.

FIG. 9 is a cross-sectional view of the main part of the mirror unit 101 (a reflecting element) of the light deflector 13, according to an embodiment of the present disclosure. The mirror unit 101 (a reflecting element) according to the present embodiment also includes a silicon supporting layer 221, a silicon oxide film layer 222, a silicon active layer 223, an interlayer film 324 on the silicon active layer 223, a metal film 325 (a first reflecting film), and a dielectric multilayered film 300 (i.e., a high reflection coating film as a second reflecting film), which are sequentially stacked, or layered on top of each other. The dielectric multilayered film 300 serves to increase the reflectivity of the metal film 325. The present embodiment as illustrated in FIG. 9 differs from the typical mirror unit as illustrated in FIG. 8 in that in the dielectric multilayered film 300 (i.e., a high reflection coating film) according to the present embodiment, a layer of low-refractive-index material 326 and a layer of high-refractive-index material 327 are alternately stacked or layered on the top of each other. In the example of FIG. 9, the layer of low-refractive-index material 326, the layer of the high-refractive-index material 327, the layer of low-refractive-index material 326, and the layer of the high-refractive-index material 327, and the layer of low-refractive-index material 326 are sequentially stacked or layered in that order on top of each other on the metal film 325. In other words, the dielectric multilayered film 300 (i.e., a high reflection coating film) according to the present embodiment has a five-layer structure in which the layer of low-refractive-index material 326 and the layer of the high-refractive-index material 327 are alternately stacked or layered on the top of each other to have the layer of low-refractive-index material 326 on the top of the structure of the dielectric multilayered film 300. In the dielectric multilayered film 300, any layer is between two of the layers of high-refractive-index material 327 or two of the layers of low-refractive-index material 326.

In one example, the layer of low-refractive-index material 326 has a refractive index of less than 1.65, and the layer of high-refractive-index material 327 has a refractive index of 1.65 or higher.

The layer of low-refractive-index material 326 is intended to have an absolute low refractive index or a refractive index lower than the layer of high-refractive-index material 327. The same applies to the layers of high-refractive-index material 327.

The layer of low-refractive-index material 326 contains, for example, silicon oxide ($SiO_2$) or magnesium fluoride ($MgF_2$). The layer of high-refractive-index material 327 contains, for example, titanium oxide ($TiO_2$), niobium pentoxide ($Nb_2O_5$), zirconia ($ZrO_2$), or tantalum pentoxide ($Ta_2O_5$).

In addition to such layers of low-refractive-index material 326 and high-refractive-index material 327, another intermediate-refractive-index material such as alumina ($Al_2O_3$) may be included in the dielectric multilayer film (i.e., a high reflection coating film) 300. When considering a refractive index of a given layer of the dielectric multilayer film (i.e., a high reflection coating film) 300, a single integrated layer formed by combining the intermediate-refractive-index material and the layer of low-refractive-index material 326 or the layer of high-refractive-index material 327 is observed.

In the example of FIG. 9, the dielectric multilayered film 300 (i.e., a high reflection coating film) have the five-layer structure. Alternatively, the dielectric multilayered film 300 (i.e., a high reflection coating film) may have a two-layer structure, a three-layer structure, a seven-layer structure, or any other multilayer structure, as long as the layer of low-refractive-index material 326 is on the top of the dielectric multilayered film 300 (i.e., a high reflection coating film), that is, the layer of low-refractive-index material 326 serves as the top layer of the dielectric multilayered film 300.

Figure 10:
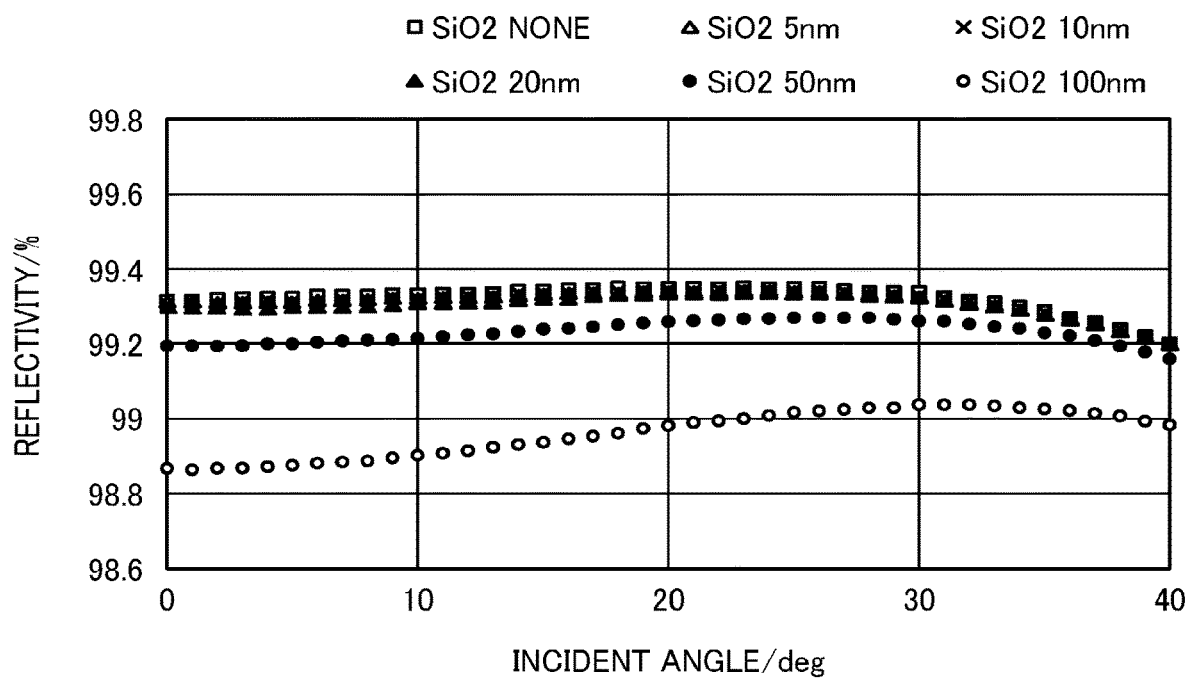
FIG. 10 is a graph of relations between incident angles of a laser beam and reflectivity of the mirror unit for a case without a layer of a low-refractive-index material on the top of a dielectric multilayered film (i.e., a high reflection coating film) of the mirror unit and for cases in each of which a layer of low-refractive-index material of a different thickness is on the top of the dielectric multilayered film.

FIG. 10 is a graph of the relations between incident angles of a laser beam and reflectivity of the mirror unit 101 for the case that a low-refractive-index material 326 containing, for example, silicon dioxide ($SiO_2$), is not on the top of the dielectric multilayered film 300 (i.e., a high reflection coating film) of the mirror unit 101, and for the cases in each of which a layer of the low-refractive-index material 326 with a different thickness is on the top (i.e., the layer of low-refractive-index material 326 serves as the top layer) of the dielectric multilayered film.

In the graph of FIG. 10, the white squares indicate a relation between incident angles of laser beams incident on the mirror unit 101 and reflectivity of the mirror unit 101 without the layer of low-refractive-index material 326 on the top of the dielectric multilayered film 300 (i.e., a high reflection coating film). In this case, an incident angle of a laser beam incident on the incident surface at a right angle is defined as 0°. The horizontal axis indicates incident angle (degree) of laser beams incident on the mirror unit 101, and the vertical axis indicates reflectivity (%) of light reflected by the mirror unit 101.

The white triangles of the graph indicate a relation between incident angles of a laser beam and reflectivity of the mirror unit 101 in which a low-refractive-index material 326 with a thickness of 5 nanometers (nm) is on the top (i.e., the layer of low-refractive-index material 326 serves as the top layer) of the dielectric multilayered film 300 (i.e., a high reflection coating film). The cross signs of the graph indicate a relation between incident angles of a laser beam and reflectivity of the mirror unit 101 in which a low-refractive-index material 326 with a thickness of 10 nm is on the top (i.e., the layer of low-refractive-index material 326 serves as the top layer) of the dielectric multilayered film 300 (i.e., a high reflection coating film).

The black triangles of the graph indicate a relation between incident angles of a laser beam and reflectivity of the mirror unit 101 in which a low-refractive-index material 326 with a thickness of 20 nm is on the top (i.e., the layer of low-refractive-index material 326 serves as the top layer) of the dielectric multilayered film (i.e., a high reflection coating film) 300. The black dots of the graph indicate a relation between incident angles of a laser beam and reflectivity of the mirror unit 101 in which a low-refractive-index material 326 with a thickness of 50 nm is on the top (i.e., the layer of low-refractive-index material 326 serves as the top layer) of the dielectric multilayered film 300 (i.e., a high reflection coating film). The white circle of the graph indicate a relation between incident angles of a laser beam and reflectivity of the mirror unit 101 in which a low-refractive-index material 326 with a thickness of 100 nm is on the top (i.e., the layer of low-refractive-index material 326 serves as the top layer) of the dielectric multilayered film (i.e., a high reflection coating film) 300.

As is apparent from FIG. 10, when the thickness of the top layer of the dielectric multilayered film 300 (i.e., a high reflection coating film) exceeds 50 nm, some areas with a reflectivity of 99.2% or less are present. To achieve a desired reflectivity (e.g., a reflectivity of 99.2% or higher in the above-described example), the thickness of the layer of low-refractive-index material 326 as the top layer of the dielectric multilayered film 300 is adjusted.

Table 1 lists the values of physical film thicknesses, refractive indexes, optical film thicknesses, and quarter-wave optical thicknesses (QWOTs) in the example of FIG. 10. The QWOT is given by a formula below: $nd=k(\lambda/4)$ where d denotes a physical film thickness, n denotes a refractive index, and nd (i.e., a multiplication of a physical film thickness d and a refractive index n) denotes an optical film thickness.

TABLE 1

| PHYSICAL FILM THICKNESS (nm) | OPTICAL FILM THICKNESS (nm) | QWOT (REFERENCE WAVELENGTH OF 905 nm) | QWOT (REFERENCE WAVELENGTH OF 940 nm) |
|---|---|---|---|
| 5 | 7.1 | 0.0314 | 0.0302 |
| 10 | 14.3 | 0.0633 | 0.0609 |
| 20 | 28.6 | 0.1265 | 0.1217 |
| 50 | 71.8 | 0.3177 | 0.3055 |
| 100 | 137 | 0.6062 | 0.5830 |

As the physical film thickness increases, the optical film thickness increases by the multiplication of the refractive index. The dielectric multilayered film (i.e., a high reflection coating film) 300 according to an embodiment of the present disclosure includes alternate layers of low and high refractive indexes, each having a QWOT expressed in the units of ¼λ. Such a dielectric multilayered film 300 (i.e., a high reflection coating film) enables an effective reflection of incident laser beams.

The reflectivity of the laser beam is, however, more adversely affected as the QWOT of the layer of low-refractive-index material 326, or the top layer serving as a protection layer, becomes closer to the QWOT of the dielectric multilayered film 300 (i.e., a high reflection coating film) as a whole. More specifically, as illustrated in FIG. 10, the reflectivity of the laser beam decreases as the physical film thickness (i.e., the thickness of the layer of low-refractive-index material 326, or the top layer) increases.

To avoid such circumstances, in the present embodiment, the layer of low-refractive-index material 326, or the top layer, is adjusted to have a QWOT of 0.1265 or less (e.g., a thickness of 20 nm) for a laser beam with a reference wavelength of 905 nm. This configuration enables a reflectivity of 99.2% or higher with the incident angles of the laser beam within the range of 0° to 40°.

Further, covering the top of the dielectric multilayered film 300 (i.e., a high reflection coating film) with the layer of low-refractive-index material 326 enables a higher reflectivity and also increases its durability against laser radiation. In other words, the embodiments of the present disclosure enable a higher reflectivity and also increases its durability against laser radiation.

As described above, the layer of low-refractive-index material 326 covering the top of the dielectric multilayered film 300 (i.e., a high reflection coating film) on the metal film 225 of the mirror unit 101 of the light deflector 13 enables a higher reflectivity and also increases its durability against laser radiation. In other words, the embodiments of the present disclosure enable a higher reflectivity and also increases its durability against laser radiation.

Figure 11:
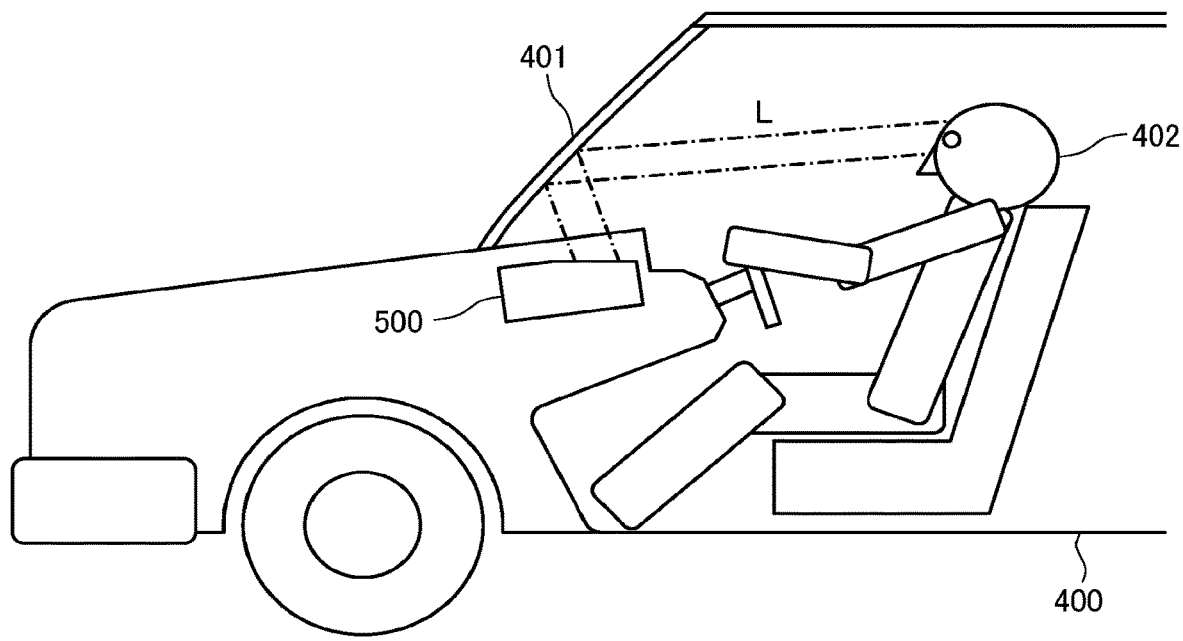
FIG. 11 is an illustration of a vehicle provided with a heads-up display (HUD) incorporating a light deflector according to another embodiment.
Figure 12:
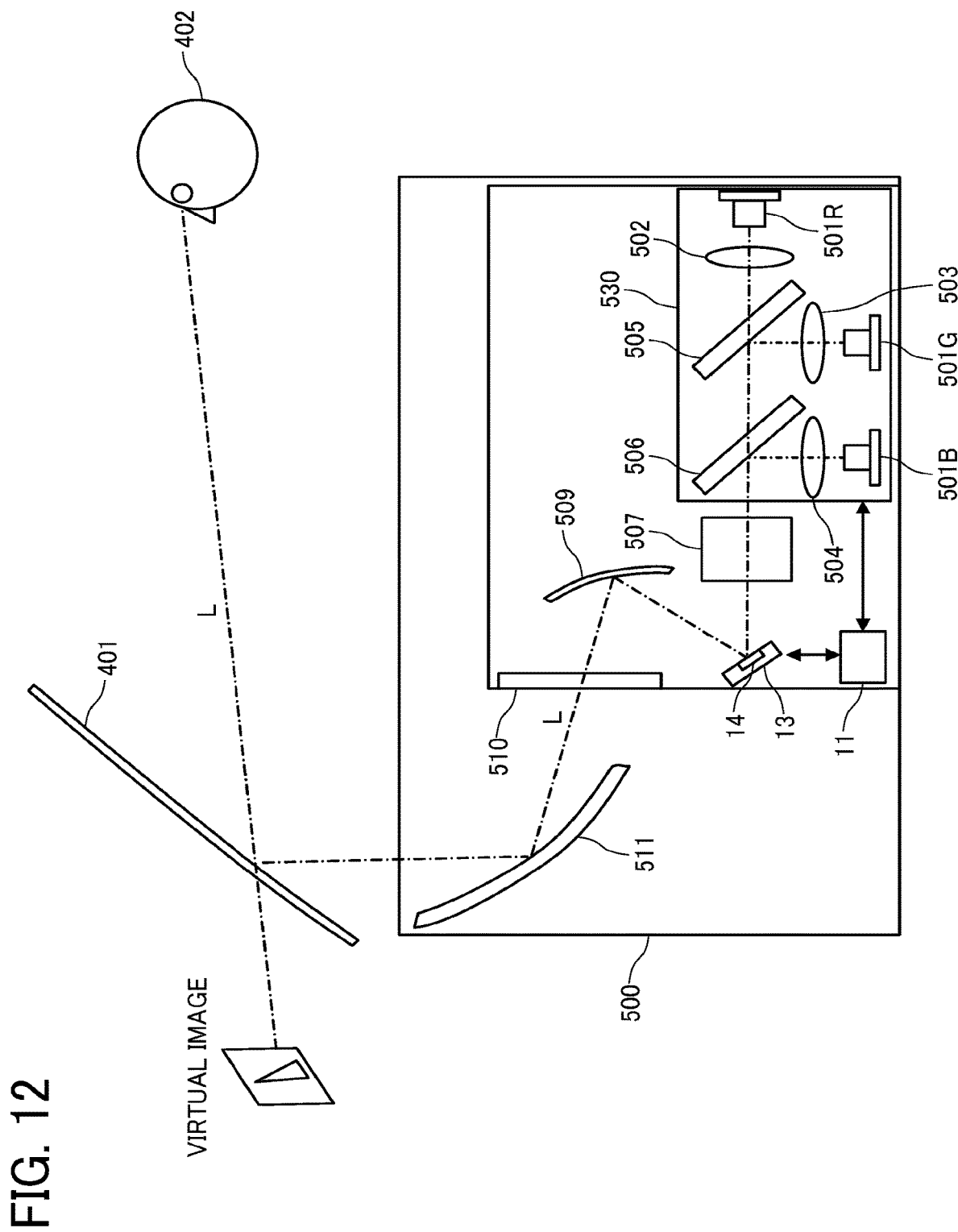
FIG. 12 is an illustration of a configuration of the HUD in FIG. 11.

A second embodiment of the present disclosure is described below. In this example, a light deflector 13 according to the second embodiment is incorporated into an image projection device. FIG. 11 is a schematic view of a vehicle 400 equipped with a HUD 500 as an example of an image projection device according to an embodiment. FIG. 12 is a schematic view of the HUD 500 according to an embodiment of the present disclosure.

As illustrated in FIG. 11, for example, the HUD 500 is disposed, for example, near a windshield 401 of the vehicle 400. Projection light L that is emitted from the HUD 500 is reflected by the windshield 401 and directed to a viewer (a driver 402) as a user. This configuration enables the driver 402 to visually recognize an image as a virtual image projected by the HUD 500. Alternatively, a combiner may be mounted on the inner wall surface of the windshield 401 to enable the user to recognize a virtual image formed by the projection light that is reflected by the combiner.

As illustrated in FIG. 12, the HUD 500 emits laser beams through red, green, and blue laser beam sources 501R, 501G, and 501B, respectively. The emitted laser beams pass through an optical system for receiving light, and then are deflected by the light deflector 13 including the movable unit 110. The optical system includes collimator lenses 502, 503, and 504 provided for the laser-beam sources 501R, 501G, and 501B, respectively, two dichroic mirrors 505 and 506, and a light-intensity adjuster 507. The deflected laser beams pass through a projection optical system and are projected onto a screen. The projection optical system includes a free-form surface mirror 509, an intermediate screen 510, and a projection mirror 511.

In the HUD 500, the laser-beam sources 501R, 501G, and 501B, the collimator lenses 502, 503, and 504, and the dichroic mirrors 505 and 506 are combined as a single integrated unit, that is, a light source unit 530 in an optical housing.

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser-beam sources 501R, 501G, and 501B are collimated by the collimator lenses 502, 503, and 504 into approximately parallel beams, and are combined by the two dichroic mirrors 505 and 506. The light intensity of the combined laser beams is adjusted by the light-intensity adjuster 507, and then two-dimensional scanning is performed by the light deflector 13 provided with the movable unit 110. The projection light L used for two-dimensional scanning by the light deflector 13 is reflected by the free-form surface mirror 509 so as to correct the distortion, and then is collected and focused onto the intermediate screen 510 to display an intermediate image on the intermediate screen 510. The intermediate screen 510 includes a microlens array in which a plurality of microlenses are two-dimensionally arranged, and enlarges the projection light L incident on the intermediate screen 510 in units of microlens.

The light deflector 13 moves the movable unit 110 biaxially in a reciprocating manner to perform two-dimensional scanning with the projection light L incident on the movable unit 110. The driving of the light deflector 13 is controlled in synchronization with the timing of light emission of the laser beam sources 501R, 501G, and 501B.

In the above description, the HUD 500 is described as an example of the image projection device. However, no limitation is indicated thereby, and the image projection device may be any apparatus that performs optical scanning, using light deflector 13 provided with the movable unit 110, to project an image. For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection device may be incorporated in, not only the vehicle or the wearable member, but also, for example, a mobile object such as an aircraft, a ship, or a mobile robot; or an immobile object such as an operation robot that operates a driving target such as a manipulator without moving from the installed location.

Figure 13:
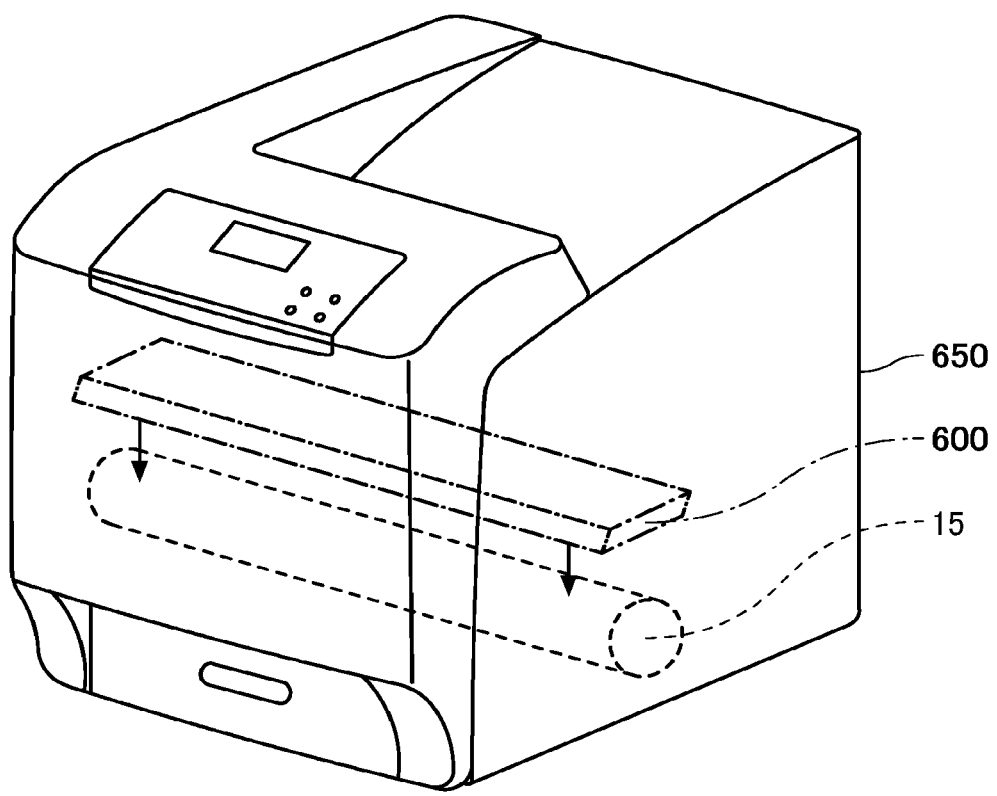
FIG. 13 is a perspective view of an optical writing device incorporating a light deflector according to still another embodiment.
Figure 14:
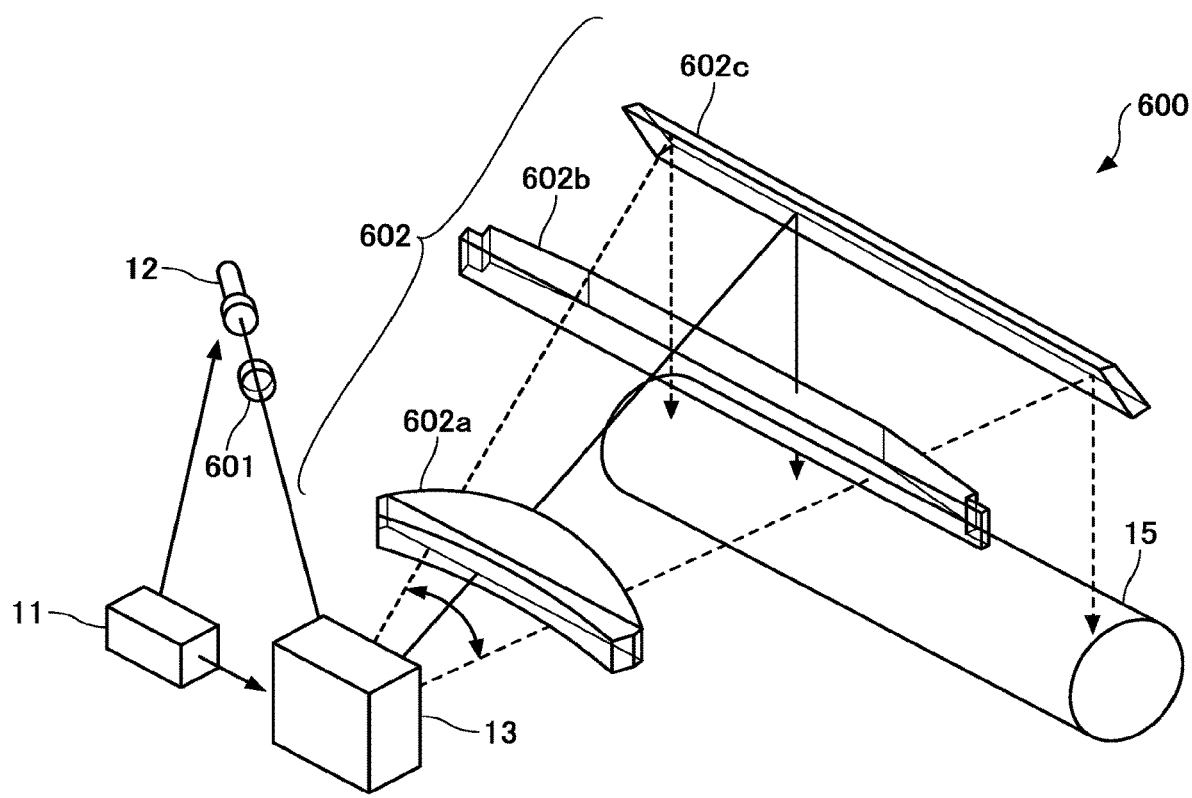
FIG. 14 is an illustration of the optical writing device in FIG. 13.

A third embodiment of the present disclosure is described below. A light deflector 13 according to the third embodiment is incorporated into an optical writing device 600. FIG. 13 is an illustration of an example of an image forming apparatus equipped with the optical writing device 600. FIG. 14 is a schematic view of an example of the optical writing device 600.

As illustrated in FIG. 13, the optical writing device 600 is used as a component of an image forming apparatus typified by a laser printer 650, for example, having printer functions using laser beams. In the image forming apparatus, the optical writing device 600 performs optical scanning on a photoconductor drum, which is the target surface 15, by using one or more laser beams, thereby performing optical writing on the photoconductor drum.

As illustrated in FIG. 14, in the optical writing device 600, the laser beam from the light-source device 12 such as a laser element passes through an image forming optical system 601 such as a collimator lens and is then deflected uniaxially or biaxially by the light deflector 13 including the movable unit 110. The laser beam deflected by the light deflector 13 passes through a scanning optical system 602 constituted by a first lens 602a, a second lens 602b, and a mirror unit 602c, and is emitted onto the target surface 15 (e.g., a photoconductor drum or photosensitive paper), thus performing optical writing. The scanning optical system 602 forms a laser beam in the form of a spot on the target surface 15. The light deflector 13 that includes the light-source device 12 and the movable unit 110 are driven under the control of the control device 11.

The optical writing device 600 is used as a component of an image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The light deflector 13 including the movable unit 110 to be applied to the optical writing device is advantageous in saving power of the optical writing device because power consumption for driving the light deflector 13 is less than that for driving a rotational polygon mirror or the like. The light deflector 13 makes a smaller wind noise when the mirror substrate oscillates than rotational polygon mirror, and thus is advantageous in achieving low noise of the optical writing device. The optical writing device requires much smaller installation space than a rotational polygon mirror, and the amount of heat generated by the light deflector 13 is small. For this reason, downsizing is easily achieved, and thus the optical writing device is advantageous in downsizing the image forming apparatus.

Figure 15:
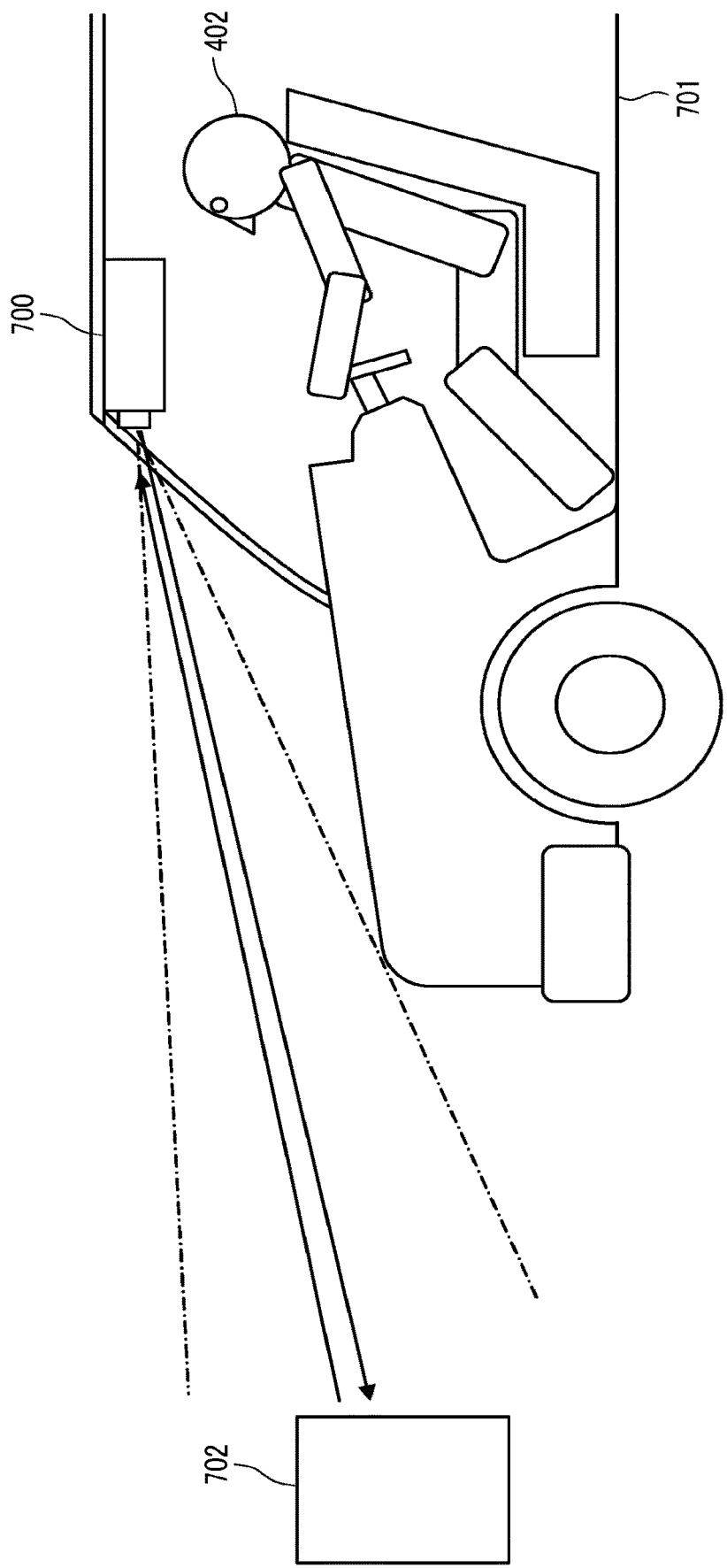
FIG. 15 is an illustration of a vehicle provided with a light detection and ranging (LiDAR) device incorporating a light deflector according to yet another embodiment.
Figure 16:
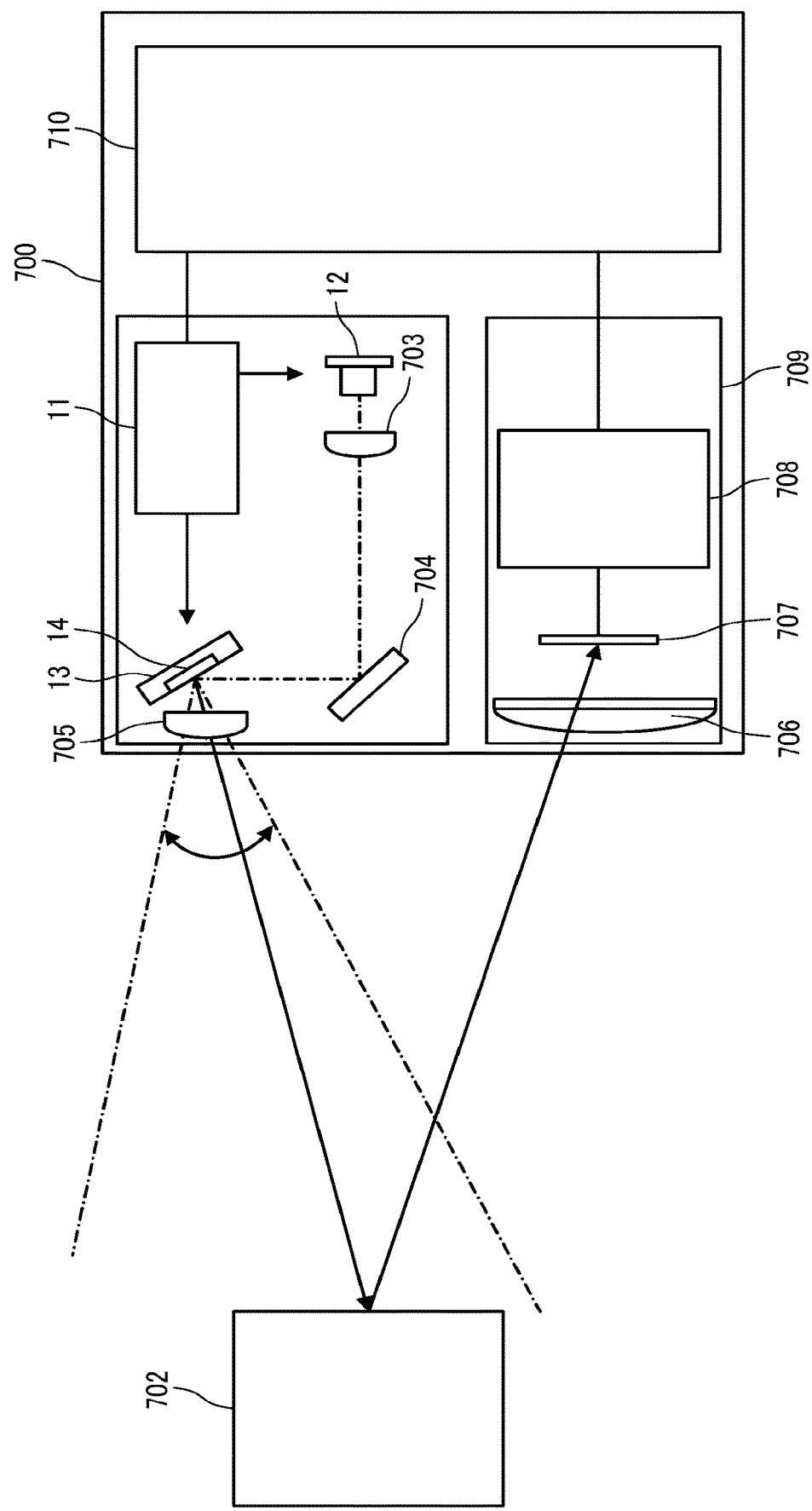
FIG. 16 is an illustration of the LiDAR device in FIG. 15.

A fourth embodiment of the present disclosure is described below. A light deflector 13 according to the fourth embodiment is incorporated into an object recognition device. FIG. 15 is a schematic diagram of a vehicle provided with a LiDAR device 700 that serves as an object recognition device, according to the present embodiment. FIG. 16 is a schematic view of an example of the LiDAR device 700.

As illustrated in FIG. 15, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

As illustrated in FIG. 16, the laser beams emitted from a light-source device 12 pass through an incident optical system, and then are caused to perform scanning uniaxially or biaxially using the light deflector 13 including the movable unit 110. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system.

The driving of the light-source device 12 and the light deflector 13 is controlled by the control device 11. The light reflected by the object 702 is detected by a photosensor 709. More specifically, the reflected light passes through, for example, a condenser lens 706 that serves as an incident-light receiving and detecting optical system, and is received by an image sensor 707. Then, the image sensor 707 outputs a detected signal to a signal processing circuit 708. The signal processing circuit 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The light deflector 13 including the reflecting surface 14 is less likely to be broken and is more compact than a polygon mirror, and thus, a highly durable and compact LiDAR device can be provided. Such a LiDAR device is attached to, for example, a vehicle, an aircraft, a ship, and a robot, and can perform optical scanning within a predetermined range to determine whether an obstacle is present or to recognize the distance to the obstacle.

In the embodiment as described above, the LiDAR device 700 is described as an example of the object recognition device. However, no limitation is indicated thereby, and the object recognition device may be any apparatus that performs optical scanning as the control device 11 controls the light deflector 13 provided with the movable unit 110 and that receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object using the distance information, and refers to records to recognize the object. The security sensor performs optical scanning in a target range to recognize an incoming object. The three-dimensional scanner performs optical scanning to obtain distance information, calculates object information such as the shape of the object using the distance information to recognize the object, and outputs the object information in the form of three-dimensional data.

Figure 17:
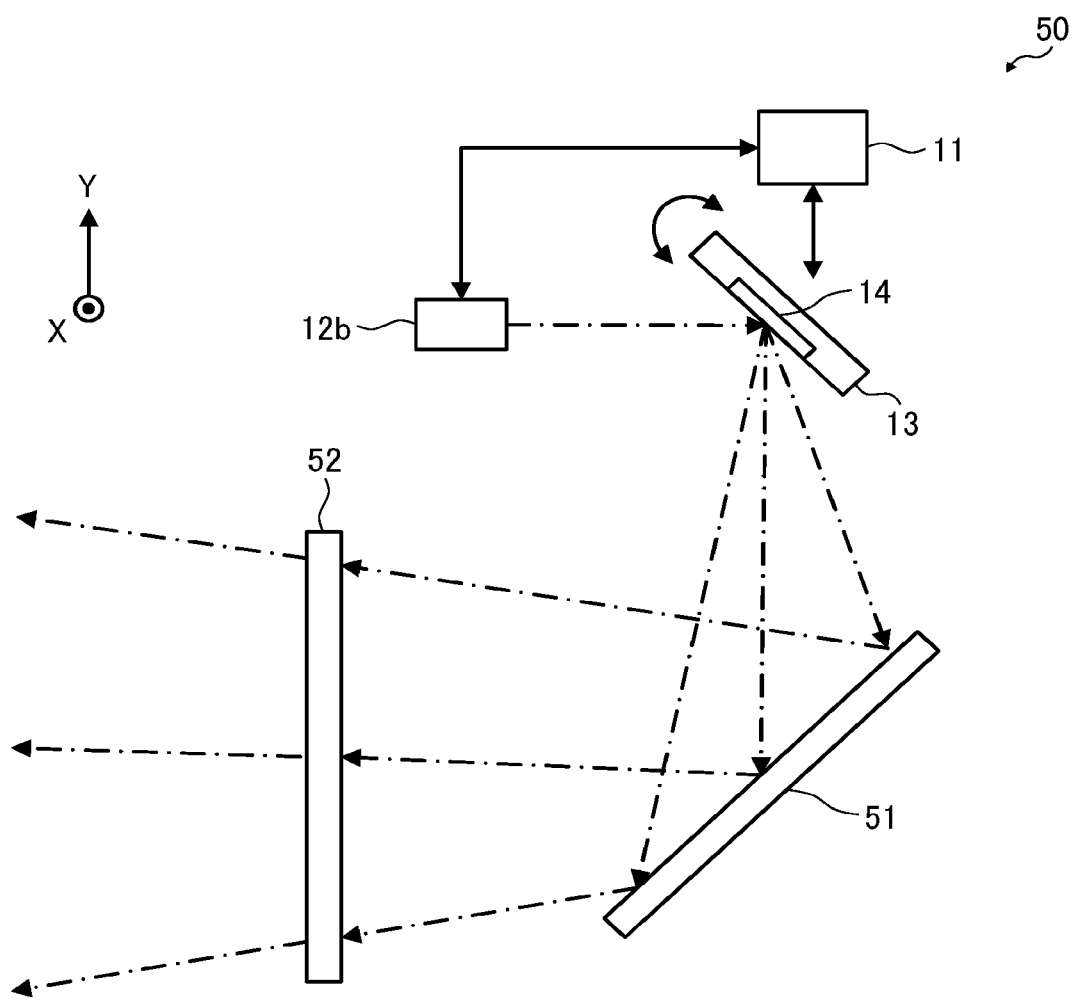
FIG. 17 is an illustration of a laser headlamp, or a headlight on a vehicle, incorporating a light deflector according to further embodiment.

A fifth embodiment of the present disclosure is described below. A light deflector 13 according to the fifth embodiment is incorporated into a laser headlamp 50, or a headlight in an automobile as an example of a mobile object. FIG. 17 is a diagram of a configuration of the laser headlamp 50. The laser headlamp 50 includes a control device 11, a light-source device 12*b*, a light deflector 13 including a movable unit 110, a mirror 51, and a transparent plate 52.

The light-source device 12*b* is a light source that emits blue laser beams. The laser beam emitted from the light-source device 12*b* is incident on the light deflector 13 and is reflected by the reflecting surface 14. The light deflector 13 moves the movable unit 110 in the XY-direction in accordance with signals from the control device 11, and performs two-dimensional scanning using the blue laser beam emitted from the light-source device 12*b* in the XY-direction.

The scanning light of the light deflector 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Thereby, the front of the automobile is illuminated with white light from the transparent plate 52.

The scanning light of the light deflector 13 scatters in a predetermined manner as passing through the fluorescent material of the transparent plate 52. Such scattering of light attenuates glare at an illuminated target in the area ahead of the vehicle.

When the light deflector 13 is applied to a headlight of a vehicle, the color of light beams from the light-source device 12*b* and the color of the phosphor are not limited to blue and yellow, respectively. For example, the light-source device 12*b* may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

A sixth embodiment of the present disclosure is described below. A light deflector 13 according to the sixth embodiment is incorporated into a head-mounted display (HMD) 60. The HMD 60 is a head-mounted display that can be mounted on a human head, and can be shaped like, for example, glasses. In the following description, such a head-mounted display may be referred to simply as an HMD.

Figure 18:
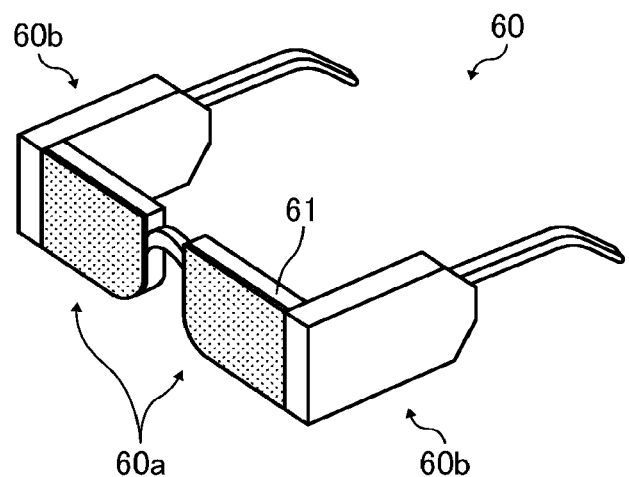
FIG. 18 is a perspective view of a head-mounted display (HMD) incorporating a light deflector according to still further embodiment.

FIG. 18 is a perspective view of the appearance of the HMD 60. In FIG. 18, the HMD 60 includes a pair of a front 60*a* and a temple 60*b* on each of the left and right, which are approximately symmetrically arranged. The front 60*a* can include, for example, a light guide plate 61. An optical system, a control device, and other components can be incorporated in the temple 60*b*.

Figure 19:
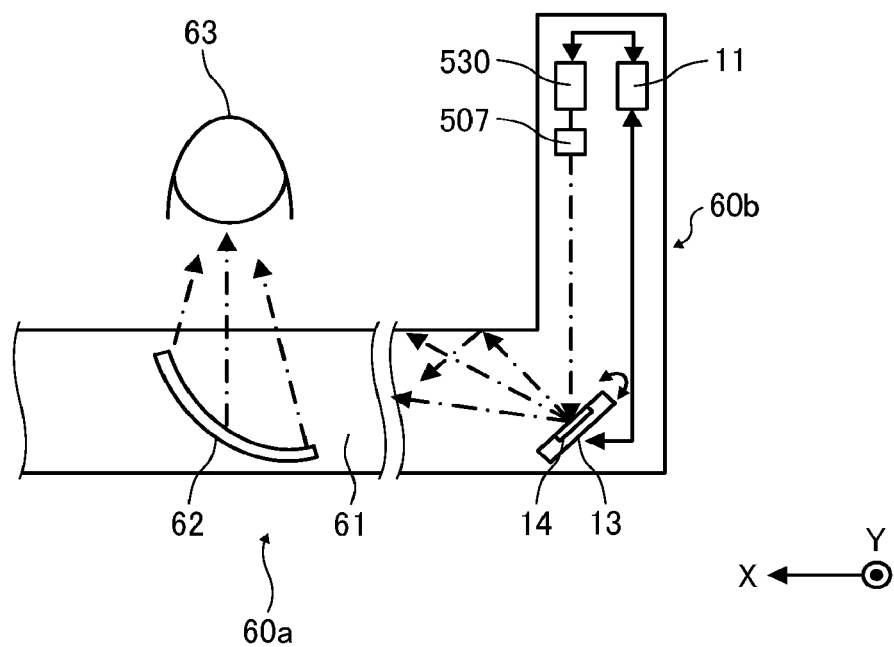
FIG. 19 is an illustration of a part of the configuration of the HMD in FIG. 18.

FIG. 19 is an illustration of a configuration of a part of the HMD 60. Although the configuration for the left eye is illustrated in FIG. 19, the HMD 60 has a configuration similar to that for the right eye. The HMD 60 includes a control device 11, a light source unit 530, a light-intensity adjuster 507, a light deflector 13 including the movable unit 110 with a reflecting surface 14, a light guide plate 61, and a half mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506. The combined parallel light is emitted from the light source unit 530.

The light intensity of the combined laser beams from the light source unit 530 is adjusted by the light-intensity adjuster 507, and then the light is incident on the light deflector 13. The light deflector 13 moves the movable unit 110 in the XY-direction based on the signal from the control device 11, and performs two-dimensional scanning with the light emitted from the light source unit 530. The driving of the light deflector 13 is controlled in synchronization with the light emission timings of the laser-beam sources 501R, 501G, and 501B, and a color image is formed with the scanning light.

The scanning light of the light deflector 13 is incident on the light guide plate 61. The light guide plate 61 guides the scanning light to the half mirror 62 while reflecting the scanning light on the inner wall surface. The light guide plate 61 is formed by, for example, resin that has transparency to the wavelength of the scanning light.

The half mirror 62 reflects the light that is guided through the light guide plate 61 to the rear side of the HMD 60, and the reflected light exits towards an eye of a wearer 63 of the HMD 60. The half mirror 62 has, for example, a free-form surface shape. The image of the scanning light is reflected by the half mirror 62, and then is formed on the retina of the wearer 63. The image of the scanning light is formed on the retina of the wearer 63 due to the reflection at the half mirror 62 and the effect of the crystalline lenses of eyeballs. Moreover, due to the reflection at the half mirror 62, the spatial distortion of the image is corrected. The wearer 63 can observe an image formed by the light of scanning in the XY direction.

As the half mirror 62 is a half mirror, the wearer 63 observes both an image formed by extraneous light and an image formed by scanning light in an overlapping manner.

The half mirror 62 may be replaced with a mirror to exclude the extraneous light. In such a configuration, only the image that is formed by scanning light can be observed.

In the present embodiment, the HMD 60 projects an image of scanning light toward the eyes of the wearer 63. Alternatively, the HMD 60 may project an image toward the lens surface facing the eyes of the user (the wearer 63).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A reflecting element comprising:
a first reflecting film to reflect light; and
a second reflecting film to increase a reflectivity of the first reflecting film,
the second reflecting film including at least one layer of high-refractive-index material and a plurality of layers of low-refractive-index material with a refractive index lower than that of the at least one layer of high-refractive-index material,
wherein one of the plurality of layers of low-refractive-index material being a top layer of the second reflecting film has a thickness of 20 nm or less and a refractive index of lower than 1.65, and
a thickness of each of the at least one layer of high-refractive-index material and the plurality layers of low-refractive-index material except the top layer of the second reflecting film is larger than a thickness of the first reflecting film.

2. The reflecting element according to claim 1,
wherein in the second reflecting film, the at least one layer of high-refractive-index material and the plurality of layers of low-refractive-index material are alternately stacked on a top of each other.

3. The reflecting element according to claim 2,
wherein the at least one layer of high-refractive-index material includes a plurality of layers of high-refractive-index material,
wherein in the second reflecting film, any layer is between two of the layers of high-refractive-index material or two of the layers of low-refractive-index material.

4. The reflecting element according to claim 3, wherein each of the plurality of layers of high-refractive-index material has a constant thickness, and each of the plurality of layers of low-refractive-index material has a constant thickness.

5. The reflecting element according to claim 2,
wherein each of the at least one layer of high-refractive-index material has a refractive index of 1.65 or higher.

6. The reflecting element according to claim 1,
wherein the second reflecting film as a whole has a reflectivity of 99.2% or higher.

7. The reflecting element according to claim 1,
wherein the second reflecting film has a quarter-wave optical thickness of 0.1265 or more for light with a wavelength of 905 nm.

8. The reflecting element according to claim 1, wherein each of the plurality of layers of low-refractive-index material comprises silicon oxide or magnesium fluoride.

9. The reflecting element according to claim 1, wherein the second reflecting film further includes a layer of an intermediate-refractive-index material, which has a refractive index between those of the at least one layer of the high-refractive-index material and the plurality of layers of low-refractive-index material.

10. The reflecting element according to claim 1, wherein the first reflecting film is in contact with one of the plurality of layers of low-refractive-index material.

11. A light deflector comprising:
the reflecting element according to claim 1, and
a movable device configured to move the reflecting element to scan with the light reflected by the reflecting element.

12. An image projection device comprising the light deflector device according to claim 11.

13. An optical writing device comprising the light deflector according to claim 11.

14. An object recognition device comprising the light deflector according to claim 11.

15. A mobile object comprising the light deflector according to claim 11.

16. A head-mounted display comprising the light deflector according to claim 11.

* * * * *